US011072673B2

United States Patent
Marutani et al.

(10) Patent No.: US 11,072,673 B2
(45) Date of Patent: Jul. 27, 2021

(54) METHACRYLIC RESIN, METHOD FOR PRODUCING METHACRYLIC RESIN, SHAPED ARTICLE AND AUTOMOBILE

(71) Applicant: Mitsubishi Chemical Corporation, Chiyoda-ku (JP)

(72) Inventors: Takao Marutani, Tokyo (JP); Masahiko Morooka, Tokyo (JP); Hiroshi Nakanishi, Tokyo (JP); Yoshiaki Murayama, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 47 days.

(21) Appl. No.: 15/743,818

(22) PCT Filed: Jul. 1, 2016

(86) PCT No.: PCT/JP2016/069671
§ 371 (c)(1),
(2) Date: Jan. 11, 2018

(87) PCT Pub. No.: WO2017/010323
PCT Pub. Date: Jan. 19, 2017

(65) Prior Publication Data
US 2018/0201711 A1 Jul. 19, 2018

(30) Foreign Application Priority Data
Jul. 14, 2015 (JP) .............................. JP2015-140181

(51) Int. Cl.
*C08F 220/14* (2006.01)
*C08J 5/00* (2006.01)
*C08F 2/38* (2006.01)
*C08F 2/02* (2006.01)
*C08F 301/00* (2006.01)

(52) U.S. Cl.
CPC .............. *C08F 220/14* (2013.01); *C08F 2/02* (2013.01); *C08F 2/38* (2013.01); *C08J 5/00* (2013.01)

(58) Field of Classification Search
CPC combination set(s) only.
See application file for complete search history.

(56) References Cited

U.S. PATENT DOCUMENTS

| 5,726,268 A | 3/1998 | Sakamoto |
| 2009/0239050 A1 | 9/2009 | Azuma et al. |
| 2012/0196127 A1* | 8/2012 | Murakami .............. C08F 2/001 428/402 |
| 2015/0166695 A1* | 6/2015 | Konishi .................. C08F 20/14 428/220 |
| 2016/0185884 A1 | 6/2016 | Yamamori et al. |

FOREIGN PATENT DOCUMENTS

| EP | 2 457 950 A1 | 5/2012 |
| JP | 8-208746 A | 8/1996 |
| JP | 2011-148978 A | 8/2011 |
| JP | 2011-168683 A | 9/2011 |
| JP | 2012-12564 A | 1/2012 |
| JP | 2012-111860 A | 6/2012 |
| JP | 2014-51620 A | 3/2014 |
| JP | 2016-8237 A | 1/2016 |
| WO | 2007/060891 A2 | 5/2007 |
| WO | 2007/060891 A3 | 5/2007 |
| WO | 2011/049203 A1 | 4/2011 |
| WO | 2014/088082 A1 | 6/2014 |

OTHER PUBLICATIONS

International Search Report dated Sep. 27, 2016 in PCT/JP2016/069671 filed Jul. 1, 2016.
Extended European Search Report dated Apr. 24, 2018 in European Patent Application No. 16824303.8, 9 pages.
Office Action dated Jun. 30, 2020 issued in corresponding Japanese patent application No. 2016-547620 (with machine translation).

* cited by examiner

*Primary Examiner* — Monique R Peets
(74) *Attorney, Agent, or Firm* — Oblon, McClelland, Maier & Neustadt, L.L.P.

(57) ABSTRACT

A methacrylic resin excellent in moldability, solvent resistance, mechanical properties and heat resistance is provided. A method for producing a methacrylic resin excellent in productivity is provided. A methacrylic resin having 99.1% by mass or more and 99.9% by mass or less of a repeating unit derived from methyl methacrylate, 0.1% by mass or more and 0.9% by mass or less of a repeating unit derived from alkyl acrylate, and a proportion of the molecular weight component of $\frac{1}{5}$ or less of the peak molecular weight $M_{ph}$ in the high molecular weight region side obtained from an elution curve by a gel permeation chromatography of the methacrylic resin is 7% or more and 40% or less.

20 Claims, 3 Drawing Sheets

METHACRYLIC RESIN, METHOD FOR PRODUCING METHACRYLIC RESIN, SHAPED ARTICLE AND AUTOMOBILE

TECHNICAL FIELD

The present invention relates to a methacrylic resin, a method for producing a methacrylic resin, a shaped article and an automobile.

Priority is claimed on Japanese Patent Application No. 2015-140181, filed on Jul. 14, 2015, the content of which is incorporated herein by reference.

BACKGROUND ART

Methacrylic resins typified by polymethyl methacrylate are widely used in various fields such as optical materials, parts for automobiles, materials for lighting, building materials and the like, due to excellent transparency and weather resistance.

In recent years, as shaped articles of methacrylic resin have become larger and finer, more excellent moldability (fluidity) is required.

As methods for improving the moldability of methacrylic resins, for example, methacrylic resins containing a high molecular weight material and a low molecular weight material have been proposed in Patent Documents 1 to 3.

CITATION LIST

Patent Literature

[Patent Document 1] International Publication No. 2007/060891 pamphlet
[Patent Document 2] International Publication No. 2011/049203 pamphlet
[Patent Document 3] Japanese Unexamined Patent Application Publication No. 2012-12564

SUMMARY OF THE INVENTION

Problems to be Solved by the Invention

However, the methacrylic resins proposed in Patent Documents 1 to 3 contain a large amount of repeating units derived from monomers other than methyl methacrylate such as methyl acrylate, therefore, the methacrylic resins of the prior arts are inferior in moldability, solvent resistance, mechanical properties, heat resistance. Furthermore, methacrylic resins proposed in Patent Documents 1 to 3 are inferior in productivity because the step of obtaining resin beads and the step of obtaining resin pellets are different.

Accordingly, an object of the present invention is to provide a methacrylic resin excellent in moldability, solvent resistance, mechanical properties and heat resistance. Another object of the present invention is to provide a method for producing a methacrylic resin excellent in productivity.

Means for Solving Problem

The present invention has the following configuration.

[1] A methacrylic resin having 99.1% by mass or more and 99.9% by mass or less of a repeating unit derived from methyl methacrylate, 0.1% by mass or more and 0.9% by mass or less of a repeating unit derived from alkyl acrylate, and a proportion of the molecular weight component of $\frac{1}{5}$ or less of the peak molecular weight Mph in the high molecular weight region side obtained from an elution curve by a gel permeation chromatography of the methacrylic resin is 7% or more and 40% or less.

[2] The methacrylic resin according to [1], wherein a mass average molecular weight Mw of the methacrylic resin is 50,000 or more and 200,000 or less.

[3] The methacrylic resin according to [1] or [2], wherein a molecular weight distribution of the methacrylic resin is 2.5 or more and 6.0 or less.

[4] The methacrylic resin according to any one of [1] to [3], having 99.6% by mass or more and 99.9% by mass or less of a repeating unit derived from methyl methacrylate, and 0.1% by mass or more and 0.4% by mass or less of a repeating unit derived from alkyl acrylate.

[5] The methacrylic resin according to any one of [1] to [4], wherein the elution curve has at least two peaks.

[6] The methacrylic resin according to [5], wherein a peak molecular weight Mph in the highest molecular weight region side is 100,000 or more and 180,000 or less.

[7] The methacrylic resin according to [5] or [6], wherein a peak molecular weight Mpl in the lowest molecular weight region side is 8,000 or more and 30,000 or less.

[8] The methacrylic resin according to any one of [1] to [7], wherein a spiral flow length is 130 mm or more.

[9] The methacrylic resin according to any one of [1] to [8], wherein a rupture time in the cantilever test is 120 seconds or more.

[10] The methacrylic resin according to any one of [1] to [9], wherein a bending fracture strength is 135 MPa or more.

[11] The methacrylic resin according to any one of [1] to [10], wherein a deflection temperature under load is 98° C. or more.

[12] A methacrylic resin, wherein a spiral flow length is 130 mm or more and a bending fracture strength of 135 MPa or more.

[13] The methacrylic resin according to [12], wherein a rupture time in the cantilever test is 120 seconds or more.

[14] A method for producing a methacrylic resin, wherein the methacrylic resin according to any one of [1] to [13] is obtained by continuous bulk polymerization.

[15] A shaped article formed by shaping the methacrylic resin according to any one of [1] to [13].

[16] An automobile including the shaped article according to [15].

Effects of the Invention

The methacrylic resin of the present invention is excellent in moldability, solvent resistance, mechanical properties and heat resistance.

The method for producing a methacrylic resin of the present invention is excellent in productivity, and the obtained methacrylic resin is excellent in moldability, solvent resistance, mechanical properties and heat resistance.

The shaped article of the present invention is excellent in solvent resistance, mechanical properties and heat resistance, and is suitable for automotive parts for automobiles.

DETAILED DESCRIPTION OF THE INVENTION

Figure 1:
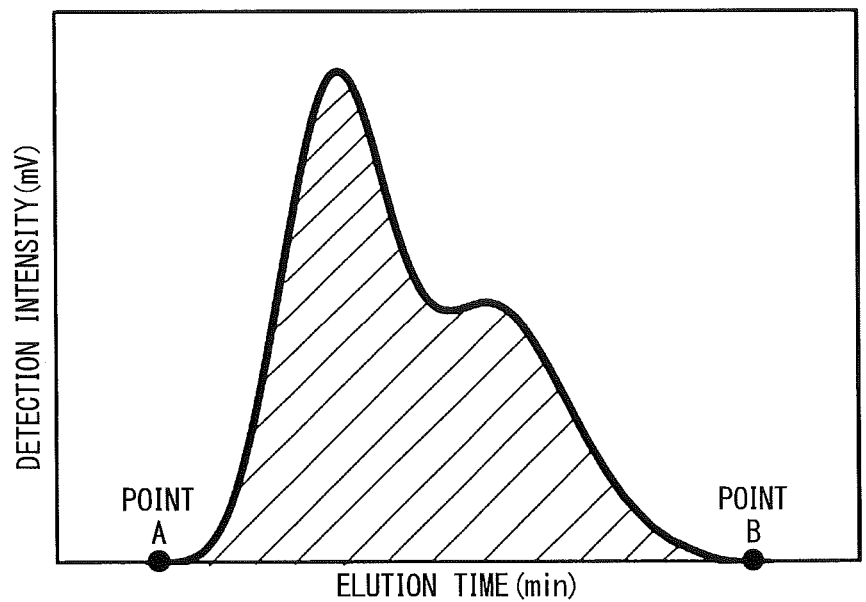
FIG. 1 is a diagram showing an area in an elution curve by gel permeation chromatography.

The methacrylic resin of the present invention contains 99.1% by mass or more and 99.9% by mass or less of a repeating unit derived from methyl methacrylate and 0.1% by mass or more and 0.9% by mass or less of a repeating unit derived from alkyl acrylate.

The content of the repeating unit derived from methyl methacrylate in the methacrylic resin is preferably 99.1% by mass or more and 99.9% by mass or less, more preferably 99.6% by mass or more and 99.9% by mass or less, and much more preferably 99.6% by mass or more and 99.8% by mass or less in 100% by mass of the methacrylic resin. When the content of the repeating unit derived from methyl methacrylate in the methacrylic resin is 99.1% by mass or more, the methacrylic resin has excellent mechanical properties and heat resistance. Further, when the content of the repeating unit derived from methyl methacrylate in the methacrylic resin is 99.9% by mass or less, the methacrylic resin is excellent in thermal stability.

In the present specification, the composition of the methacrylic resin is obtained by introducing the thermal decomposition product obtained by thermal decomposition at the temperature at which the methacrylic resin to be analyzed is sufficiently depolymerized into the gas chromatograph, and the peak area value derived from methyl methacrylate and alkyl acrylate calculated from the obtained gas chromatogram is used as a value calculated using a calibration curve obtained from a standard methacrylic resin to be described later.

As a calibration curve, a standard methacrylic resin containing known quantities of quantitative alkyl acrylate produced by the same production method as the methacrylic resin to be analyzed was used as a standard substance. This standard methacrylic resin is calculated from a gas chromatogram obtained by thermal decomposition under the same conditions as the methacrylic resin to be analyzed.

The content of the repeating unit derived from alkyl acrylate in the methacrylic resin is 0.1% by mass or more and 0.9% by mass or less, preferably 0.1% by mass or more and 0.4% by mass or less, more preferably 0.2% by mass or more and 0.4% by mass or less in 100% by mass of the methacrylic resin. When the content of the alkyl acrylate-derived repeating unit in the methacrylic resin is 0.1% by mass or more, the methacrylic resin has excellent thermal stability. In addition, when the content of the alkyl acrylate-derived repeating unit in the methacrylic resin is 0.9% by mass or less, the methacrylic resin has excellent mechanical properties and heat resistance.

As the alkyl acrylate, for example, methyl acrylate, ethyl acrylate, n-propyl acrylate, iso-propyl acrylate, n-butyl acrylate, iso-butyl acrylate, sec-butyl acrylate, tert-butyl acrylate, n-hexyl acrylate, cyclohexyl acrylate, n-octyl acrylate, 2-ethylhexyl acrylate and the like. One of these alkyl acrylates may be used alone, or two or more of them may be used in combination. In view of suppressing the production cost, among these alkyl acrylates, methyl acrylate, ethyl acrylate and n-butyl acrylate are preferable, methyl acrylate and ethyl acrylate are more preferable, and methyl acrylate is most preferable.

The methacrylic resin may contain repeating units derived from other monomers in addition to the repeating unit derived from methyl methacrylate and the repeating unit derived from alkyl acrylate, as long as the intrinsic performance of the methacrylic resin is not impaired.

The content of repeating units derived from other monomers in the methacrylic resin is preferably 1% by mass or less, more preferably 0.1% by mass or less, since it does not impair the intrinsic performance of the methacrylic resin.

Examples of other monomers include (meth) acrylamide compounds such as ethyl methacrylate, n-propyl methacrylate, iso-propyl methacrylate, n-butyl methacrylate, iso-butyl methacrylate, sec-butyl methacrylate, tert-butyl methacrylate, n-hexyl methacrylate, cyclohexyl methacrylate, n-octyl methacrylate, 2-ethylhexyl methacrylate, phenyl (meth) acrylate and the like; (meth)acrylic acid; (meth) acrylonitrile; (meth) acrylamide compounds such as (meth) acrylamide, N-dimethyl (meth) acrylamide, N-diethyl (meth) acrylamide, N-butyl (meth) acrylamide, dimethylaminopropyl (meth) acrylamide, N-methylol (meth) acrylamide, N-methoxymethyl (meth) acrylamide, N-butoxymethyl (meth) acrylamide, hydroxyethyl (meth) acrylamide, methylenebis (meth) acrylamide and the like; aromatic vinyl compounds such as styrene and α-methylstyrene; vinyl ether compounds such as vinyl methyl ether, vinyl ethyl ether, 2-hydroxyethyl vinyl ether and the like; vinyl carboxylate compounds such as vinyl acetate and vinyl butyrate; and olefin compounds such as ethylene, propylene, butane, isobutene and the like. One kind of these other monomers may be used alone, or two or more kinds of them may be used in combination.

In the present specification, (meth) acrylate refers to methacrylate, acrylate or both.

The methacrylic resin is obtained by polymerizing methyl methacrylate, alkyl acrylate, and, if necessary, other monomers.

Examples of the polymerization method include bulk polymerization, solution polymerization, suspension polymerization, emulsion polymerization and the like. Among these polymerization methods, in view of unnecessary of emulsion and excellent optical properties of the methacrylic resin, bulk polymerization, solution polymerization, and suspension polymerization are preferable. In view of excellent productivity and suppressing contamination of foreign materials, continuous bulk polymerization is more preferred.

Examples of the polymerization initiator include organic peroxides such as tert-butyl peroxy-3,5,5-trimethyl hexanate, tert-butyl peroxylaurate, tert-butyl peroxy isopropyl monocarbonate, tert-hexyl peroxy isopropyl monocarbonate, tert-butyl peroxyacetate, 1,1-bis (tert-butylperoxy) 3,3,5-trimethylcyclohexane, 1,1-bis (tert-butylperoxy) cyclohexane, tert-butylperoxy 2-ethylhexanate, tert-butylperoxyisobutyrate, tert-hexylperoxy 2-ethylhexanate, di-tert-butyl peroxide, di-tert-hexyl peroxide, 2,5-dimethyl-2,5-bis (tert-butylperoxy) hexane and the like; azo compounds such as 2-(carbamoylazo)-isobutyronitrile, 1,1'-azobis (1-cyclohexanecarbonitrile), 2,2'-azobisisobutyronitrile, 2,2'-azobis (2-methylbutyronitrile), dimethyl 2,2'-azobisisobutyrate, 2,2'-azobis (2,4,4-trimethylpentane), 2,2'-azobis (2-methylpropane) and the like. These polymerization initiators may be used alone, or two or more of them may be used in combination. Among these polymerization initiators, organic peroxides are preferred, especially, tertiary butyl peroxy-3,5,5-trimethylhexanate and di-tert-butyl peroxide are more preferable in view of suppressing the production costs.

The amount of the polymerization initiator to be used is preferably 0.001 parts by mass or more and 1 part by mass or less, more preferably 0.005 parts by mass or more and 0.1 parts by mass or less with respect to 100 parts by mass of the total monomers, since a desired weight average molecular weight Mw, a molecular weight distribution, a peak molecular weight and the like can be obtained. When the use amount of the polymerization initiator is 0.001 parts by mass or more, excellent polymerization rate of the monomer can be obtained. In addition, when the amount of the polymerization initiator used is 1 part by mass or less, the production cost can be suppressed.

Examples of the chain transfer agent include mercaptan compounds and the like. One type of these chain transfer agents may be used alone, or two or more types may be used in combination. Among these chain transfer agents, the mercaptan compound is preferable because the production cost can be suppressed.

Examples of the mercaptan compound include primary, secondary, tertiary mercaptan compounds having an alkyl group or substituted alkyl group such as n-butyl, iso-butyl, sec-butyl, tert-butyl, n-octyl, n-dodecyl; aromatic mercaptans such as phenyl mercaptan, thiocresol, 4-tert-butyl-o-thiocresol and the like; thioglycolic acid and esters thereof; mercaptans having 2 to 18 carbon atoms such as ethylene thioglycol and the like. One of these mercaptan compounds may be used alone, or two or more of them may be used in combination. Among these mercaptan compounds, in view of suppressing the procution costs, n-butyl mercaptan, tert-butyl mercaptan, n-octyl mercaptan and n-dodecyl mercaptan are preferable, n-butyl mercaptan and n-octyl mercaptan are more preferable.

The amount of the chain transfer agent to be used is preferably 0.01 parts by mass or more and 2 parts by mass or less, more preferably 0.05 parts by mass or more and 1 part by mass or less with respect to 100 parts by mass of the total monomers, since a desired mass average molecular weight Mw, a molecular weight distribution, a peak molecular weight and the like can be obtained. When the amount of the chain transfer agent used is 0.01 parts by mass or more, excellent monomer polymerization stability can be obtained. Further, when the amount of the chain transfer agent used is 2 parts by mass or less, the production cost can be suppressed.

In the methacrylic resin of the present invention, the proportion of the molecular weight component of ⅕ or less of the peak molecular weight Mph in the high molecular weight region side obtained from the elution curve by gel permeation chromatography is 7% to 40%.

In the present specification, the weight average molecular weight Mw, the molecular weight distribution, the peak molecular weight, and the proportion of the molecular weight component of ⅕ or less of the peak molecular weight Mph in the high molecular weight region side are values obtained by gel permeation chromatography.

Measurement by gel permeation chromatography is carried out by preparing a methacrylic resin solution to be analyzed at a concentration at which the molecules of the methacrylic resin to be analyzed are sufficiently solvated, introducing an solvent in which methacrylic resin dissolved as eluent into a gel permeation chromatography, and calculating the relative molecular weight by using the obtained elution curve (gel permeation chromatogram) and the calibration curve prepared using the molecular weight standard polymer.

The gel permeation column to be used is a column having an exclusion limit with sufficient margin with respect to the assumed molecular weight of the methacrylic resin.

The calibration curve is prepared by using a molecular weight marker standard polymer having a known molecular weight selected so that it can be prepared in a form including from the exclusion limit of the gel permeation column to be used up to a sufficiently low molecular weight range with respect to the assumed molecular weight of the methacrylic resin. A solution adjusted to the same concentration as that of the methacrylic resin solution to be analyzed was introduced into a gel permeation chromatograph of the same condition analyzed the methacrylic resin to be analyzed, and the retention time at the peak top of each molecular weight marker standard polymer obtained is used.

Using the elution curve and the calibration curve, the weight average molecular weight Mw, the molecular weight distribution, the peak molecular weight, and the proportion of the molecular weight component of ⅕ or less of the peak molecular weight Mph in the high molecular weight region side is calculated.

In the elution curve and the calibration curve, the value at the elution time is set as follows.

Mti: molecular weight obtained from calibration curve at elution time ti

Hti: Intensity of elution curve at elution time ti

At this time, the weight average molecular weight Mw, the number average molecular weight Mn, and the molecular weight distribution are calculated by the following formulas (1) to (3).

[Mathematical Formula 1]

$$Mw = \frac{\Sigma(Hti \times Mti)}{\Sigma(Hti)} \quad (1)$$

[Mathematical Formula 2]

$$Mn = \frac{\Sigma(Hti)}{\Sigma(Hti/Mti)} \quad (2)$$

[Mathematical Formula 3]

$$\text{Molecular weight distribution} = Mw/Mn \quad (3)$$

Here, the peak indicates the elution time at which the sign of the first derivative curve of the elution curve is reversed. When the peak (local minimum) point of a certain peak overlaps with another peak, there is a case where there is no reversal of sign, but elution time of the peak can be read using inflection point of the first derivative curve. Changes in value in a short time of less than 1/100th of the dissolution time of the dissolution curve existing in the chromatogram are considered as noise, not included in the peak.

The peak molecular weight is calculated from the elution curve and the calibration curve as follows.

When the elution time of the peak present in the elution curve is Ti, the molecular weight determined from the calibration curve at the elution time Ti is set as the peak molecular weight. When there are many peaks in the elution curve, the number of peak molecular weights is also calculated.

In the present specification, the peak molecular weight of the peak observed in the highest molecular weight region side in the elution curve is Mph, and the peak molecular weight of the peak observed in the lowest molecular weight region side in the elution curve is Mpl. In addition, when there is one peak of the elution curve, its peak molecular weight is set as the peak molecular weight Mph in the highest molecular weight region side.

The proportion of the molecular weight component of ⅕ or less of the peak molecular weight Mph in the high molecular weight region side is calculated from the elution curve and the calibration curve as follows.

The elution time Tmph which gives a value obtained by dividing the peak molecular weight Mph in the high molecular weight region side by 5 is calculated from the calibration curve, and when the elution curve was splitted around the time of Tmph, the peak area in the lower molecular weight region side than Tmph is divided by the peak area of the entire peak of the elution curve, and the proportion of the molecular weight component of ⅕ or less of the peak molecular weight Mph in the high molecular weight region side is calculated.

The weight average molecular weight Mw of the methacrylic resin is preferably from 50,000 to 200,000, more preferably from 70,000 to 150,000, and much more preferably from 80,000 to 120,000. When the weight average molecular weight Mw of the methacrylic resin is 50,000 or more, excellent mechanical properties of the methacrylic resin can be obtained. When the weight average molecular weight Mw of the methacrylic resin is 200,000 or less, the methacrylic resin is excellent in moldability.

The molecular weight distribution of the methacrylic resin is preferably 2.5 or more and 6.0 or less, more preferably 3.0 or more and 5.0 or less, and much more preferably 3.5 or more and 4.5 or less. When the molecular weight distribution of the methacrylic resin is 2.5 or more, the methacrylic resin is excellent in moldability. In addition, when the molecular weight distribution of the methacrylic resin is 6.0 or less, it is capable of suppressing mixing of a high-flowing low-molecular-weight methacrylic resin and a low-flowing high-molecular methacrylic resin, and excellent flow stability (moldability) of the methacrylic resin can be obtained.

The number of the peak of the elution curve of the methacrylic resin is preferably one to three, more preferably one to two, and much more preferably two, in view of excellency in moldability (flowability) and flow stability of the methacrylic resin. In particular, since the methacrylic resin is excellent in moldability, mechanical properties and heat resistance, the number of the peaks at which the sign of the first derivative curve of the methacrylic resin inverts is preferably two.

The peak molecular weight Mph in the high molecular weight region side of the methacrylic resin is preferably 100,000 or more and 180,000 or less, more preferably 110,000 or more and 160,000 or less, much more preferably 120,000 or more and 140,000 or less. When the peak molecular weight Mph in the high molecular weight region side of the methacrylic resin is 100,000 or more, excellent mechanical properties of the methacrylic resin can be obtained. In addition, when the peak molecular weight Mph in the high molecular weight region side of the methacrylic resin is 180,000 or less, excellent moldability can be obtained.

The peak molecular weight Mpl in the low molecular weight region side of the methacrylic resin is preferably 8,000 or more and 30,000 or less, more preferably 10,000 or more and 25,000 or less, much more preferably 12,000 or more and 20,000 or less. When the peak molecular weight Mpl in the low molecular weight region side of the methacrylic resin is 8,000 or more, the methacrylic resin is excellent in heat resistance. Further, when the peak molecular weight Mpl in the low molecular weight region side of the methacrylic resin is 30,000 or less, the methacrylic resin is excellent in moldability.

The proportion of the molecular weight component of ⅕ or less of the peak molecular weight Mph in the high molecular weight region side of the methacrylic resin is preferably 7% or more and 40% or less, more preferably 10% or more and 35% or less, much more preferably 15% or more and 30% or less. When the proportion of the molecular weight component of ⅕ or less of the peak molecular weight Mph in the high molecular weight region side of the methacrylic resin is 7% or more, the methacrylic resin is excellent in moldability. Further, when the proportion of the molecular weight component of ⅕ or less of the peak molecular weight Mph in the high molecular weight region side of the methacrylic resin is 40% or less, excellent mechanical properties and heat resistance of the methacrylic resin can be obtained.

In order to increase the proportion of the molecular weight component of ⅕ or less of the peak molecular weight Mph in the high molecular weight region side of the methacrylic resin to 7% or more, for example, the following production method can be mentioned.

Production method 1: a method of polymerizing a part of monomers, then adding a polymerization aid such as a polymerization initiator or a chain transfer agent, and polymerizing the remaining monomers.

Production method 2: a method in which monomers are polymerized, and then monomers are further added for polymerization.

Production method 3: a method in which two types of polymers having different molecular weights are separately produced and blended.

Among these production methods, in view of excellent productivity, preferably Production method 1, Production method 2, Production method 3, more preferably Production method 1 and Production method 3 can be conducted. In view of suppressing the contamination of foreign matter and excellent productivity, production method 1 can be preferably conducted.

Production method 1 is a method of polymerizing a part of monomers, then adding a polymerization aid such as a polymerization initiator or a chain transfer agent, and polymerizing the remaining monomers.

In the polymerization method in Production method 1, bulk polymerization and solution polymerization are preferable, bulk polymerization is more preferable, and continuous bulk polymerization is even more preferable, in view of suppressing contamination of foreign matter and excellent in productivity.

Hereinafter, an example of a method in which Production method 1 is performed by continuous bulk polymerization will be described.

As a continuous bulk polymerization apparatus, a known continuous bulk polymerization apparatus can be used. However, from the viewpoint of obtaining an excellent productivity, it is preferable to use a device equipped with a supply port for supplying a polymerization aid such as a polymerization initiator or a chain transfer agent provided between a complete mixing vessel type reactor, connected in series and a plug flow type tube reactor apparatus.

Specific methods of continuous bulk polymerization include, for example, a method in which the following Steps A to D are carried out continuously. Since contamination of foreign matter can be suppressed and excellent productivity can be obtained, a method in which step A to step D are continuously performed is preferable.

Step A: Methyl methacrylate, alkyl acrylate, if needed, other monomers, and a polymerization aid such as a polymerization initiator or a chain transfer agent and the like are supplied to a complete mixing vessel type reactor, and a part of the monomers are polymerized (polymerization in the first stage).

Step B: A polymerization aid such as a polymerization initiator or a chain transfer agent is additionally supplied.

Step C: Polymerize the remaining monomer (polymerization in the second stage) in a plug flow type tube reactor.

Step D: Volatile unreacted monomers and the like to obtain a methacrylic resin.

The polymerization rate of the polymerization in the first stage in the step A is preferably 35% or more and 50% or less, more preferably 40% or more and 45% or less. When the polymerization rate of the polymerization in the first stage in Step A is 35% or more, superior polymerization stability can be obtained. In addition, when the polymerization rate of the first stage polymerization in Step A is 50% or less, excellent productivity can be obtained.

Examples of a method for supplying a polymerization aid such as a polymerization initiator or a chain transfer agent in the step B include a method using a device such as a static mixer and a small extruder. One of these devices may be used alone, or two or more of these devices may be used in combination. In addition, two or more of these apparatuses may be juxtaposed in accordance with the type of additionally supplied polymerization aid or the like. Among these apparatuses, a static mixer is preferable because it is excellent in productivity.

The polymerization rate of the second stage polymerization in step C is preferably 50% or more and 80% or less, more preferably 65% or more and 75% or less. When the polymerization rate of polymerization in the second step in step C is 50% or more, unreacted monomers are reduced and excellent productivity can be obtained. In addition, when the polymerization rate of the polymerization in the second step in the step C is 80% or less, the fluidity of the obtained polymer composition (a mixture including the monomer and the polymer) is high and excellent productivity can be obtained.

Examples of the apparatus for volatilizing unreacted monomer or the like in the step D include an extrusion molding machine with a vent, a thin film devolatilizing apparatus and the like. Among these apparatuses, in view of excellent productivity, an extrusion molding machine with a vent is preferable, and an extrusion molding machine with multiple vents is more preferable.

Production method 2 is a method in which monomers are polymerized and then monomers are further added for polymerization.

In the polymerization method in Production method 2, in view of easy addition of monomers, suspension polymerization and emulsion polymerization are preferable, and suspension polymerization is more preferable.

Production method 3 is a method in which two types of polymers having different molecular weights are separately produced and blended.

In the polymerization method in Production method 3, since an emulsifier is unnecessary and excellent optical properties of the methacrylic resin can be obtained, bulk polymerization, solution polymerization, and suspension polymerization are preferable, and bulk polymerization is more preferable.

The spiral flow length of the methacrylic resin is preferably 130 mm or more, more preferably 140 mm or more, since it is excellent in moldability of the methacrylic resin.

In the present specification, the spiral flow length of the methacrylic resin is a value measured with an injection molding machine under the condition of a measuring mold having a depth of 1 mm and a resin temperature of 250° C.

The rupture time of the methacrylic resin in the cantilever test is preferably 120 seconds or more, more preferably 150 seconds or more, since it is excellent in mechanical properties of the methacrylic resin.

In the present specification, the rupture time in the cantilever test of the methacrylic resin is a value measured under the same conditions as in Examples described later.

The methacrylic resin may optionally contain additives.

Examples of the additives include ultraviolet absorbers, antioxidants, colorants such as pigments and the like. One of these other additives may be used alone, or two or more of them may be used in combination.

The shaped article of the present invention is obtained by shaping the methacrylic resin of the present invention.

Examples of a shaping method for obtaining a shaped article include injection molding, extrusion molding, pressure molding and the like. Further, the resulting shaped article may be further subjected to secondary shaping such as pressure molding or vacuum molding.

Shaping conditions such as shaping temperature, shaping pressure and the like may be set as appropriate.

Since the shaped article of the present invention is excellent in solvent resistance, mechanical properties and heat resistance, it can be used for optical materials, automotive parts for automobiles, materials for lighting, building materials and the like. In particular, it is preferable for automotive parts for automobiles.

Examples of parts of automobiles include rear lamp outer covers, optical members inside the rear lamps, inner lenses for headlights (sometimes referred to as projector lenses and PES lenses), meter covers, door mirror housings, pillar covers Sash cover), licensed garnish, front grill, fog garnish, emblem and the like.

EXAMPLES

Hereinafter, the present invention will be specifically described with reference to Examples, but the present invention is not limited to these Examples.

(Measurement by Gel Permeation Chromatography)

Measurement of gel permeation chromatography (hereinafter sometimes abbreviated as "GPC") was carried out under the following apparatus conditions.

Measuring device: HPLC-8220 GPC (manufactured by Tosoh Corporation)
Separation column: TSK-GEL SUPER HM-H (manufactured by Tosoh Corporation)
6.0 mmφ×150 mm, two in series connection
Exclusion limit molecular weight 400,000,000
Guard column: TSK-GUARDCOLUMN SUPER H-H (manufactured by Tosoh Corporation)
4.6 mmφ×35 mm
Detector: differential refractometer
Measurement temperature: 40° C.
Solvent: tetrahydrofuran
Solvent flow rate: 0.6 ml/min Sample concentration: 0.24% (0.06 g of sample dissolved in 25 ml of tetrahydrofuran)
Injection volume: 10 μl
Internal standard: 2-2'-methylenebis (4-methyl-6-t-butylphenol)
Molecular weight: 340.5
A calibration curve was prepared using the TSK STANDARD POLYSTYRENE (manufactured by Tosoh Corporation), under the above-mentioned apparatus and conditions, prior to GPC measurement.

The content of the molecular weight component of ⅕ or less of Mph is determined as follows.

First, the area of the methacrylic resin in the GPC elution curve is determined. The area in the GPC elution curve refers to the hatched portion shown in FIG. 1. The way of determining the area, first, the GPC elution curve obtained from the elution time obtained by GPC measurement and the detection intensity by RI (differential refractometer) is subtracted from the baseline drawn automatically by the measuring instrument, and the point where it crosses the GPC elution curve define A and Point B. Point A is the point where the GPC elution curve at the beginning of the elution time crosses the baseline. The point B is a position where the mass average molecular weight is 500 or more and the base line intersects the elution curve. If it does not cross, the value of RI detection intensity of elution time with weight average molecular weight of 500 is set as point B. The hatched area surrounded by the GPC elution curve between points A and B and the baseline, is an area in the GPC elution curve. This area is the area in the GPC elution curve. In this example and comparative example, since a column eluted from a high molecular weight component is used, a high molecular weight component is observed at the initial elution time (point A side) and a low molecular weight component is observed at the end of elution time (point B side).

Figure 2:
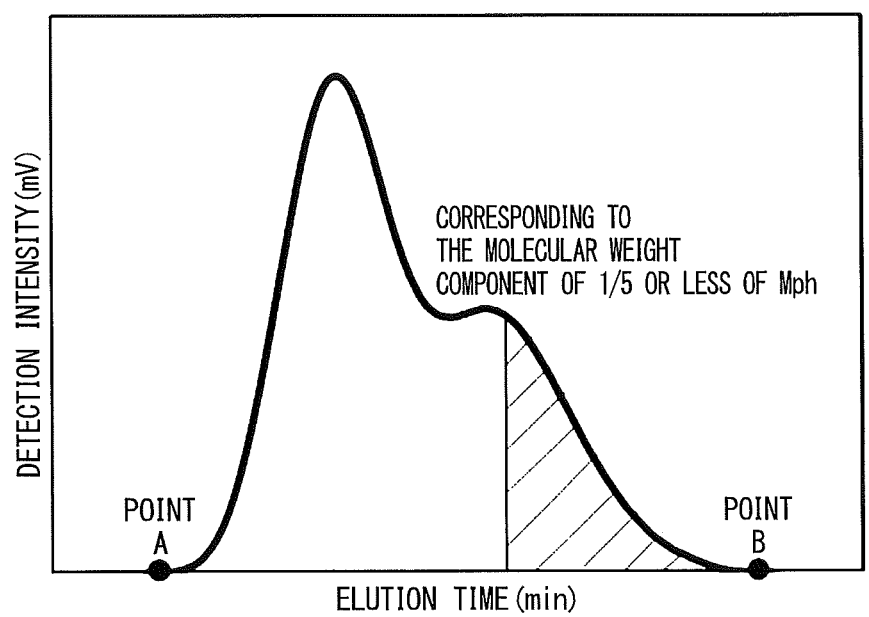
FIG. 2 is a diagram showing an area in an elution curve by gel permeation chromatography corresponding to a molecular weight component of $\frac{1}{5}$ or less of the peak molecular weight in the high molecular weight region side.
Figure 3:
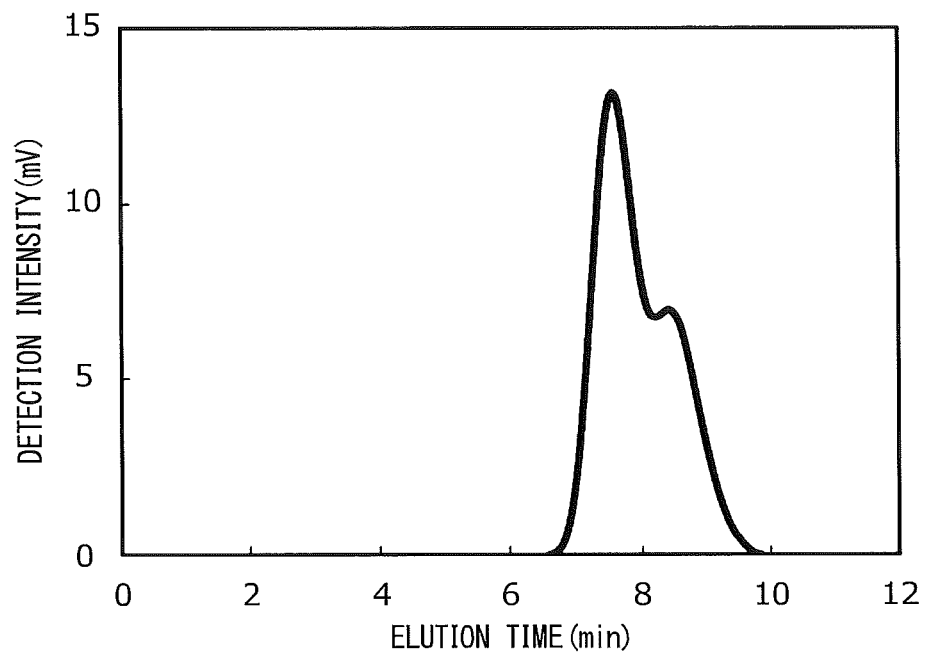
FIG. 3 is a diagram showing an elution curve by gel permeation chromatography of the methacrylic resin obtained in Example 1.
Figure 4:
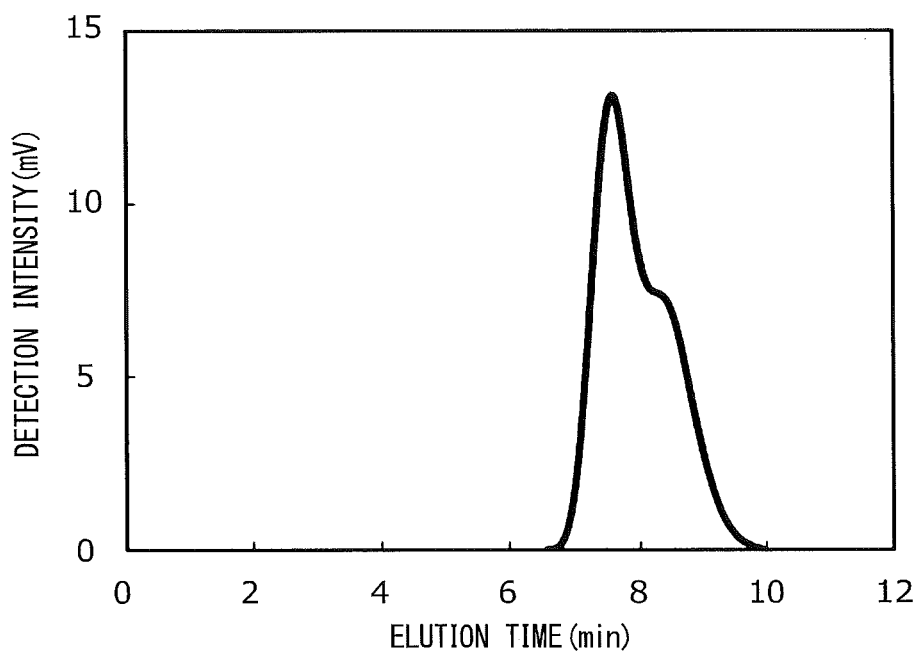
FIG. 4 is a diagram showing an elution curve by gel permeation chromatography of the methacrylic resin obtained in Example 2.
Figure 5:
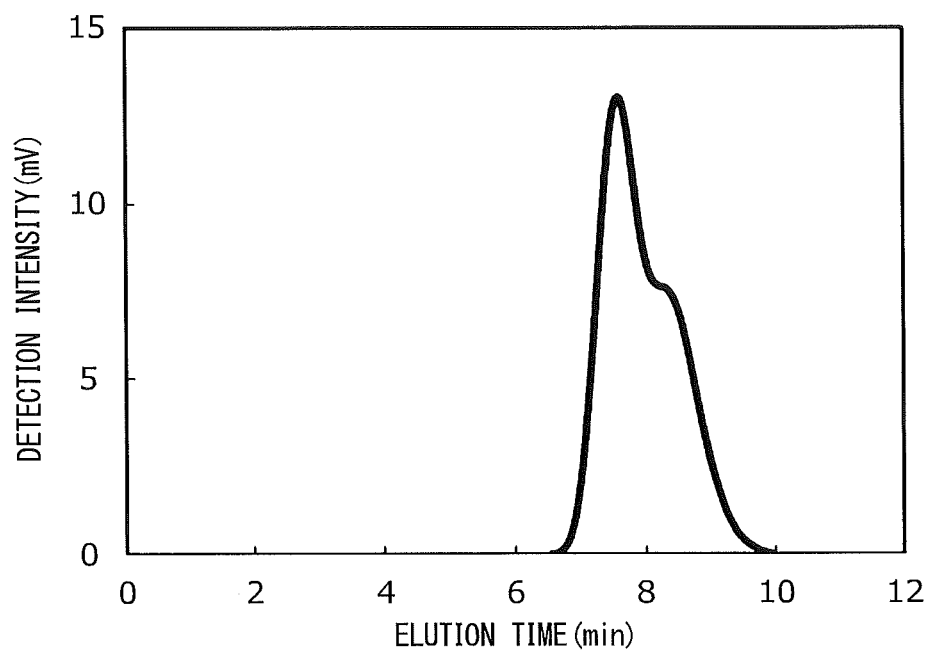
FIG. 5 is a diagram showing an elution curve by gel permeation chromatography of the methacrylic resin obtained in Comparative Example 1.
Figure 6:
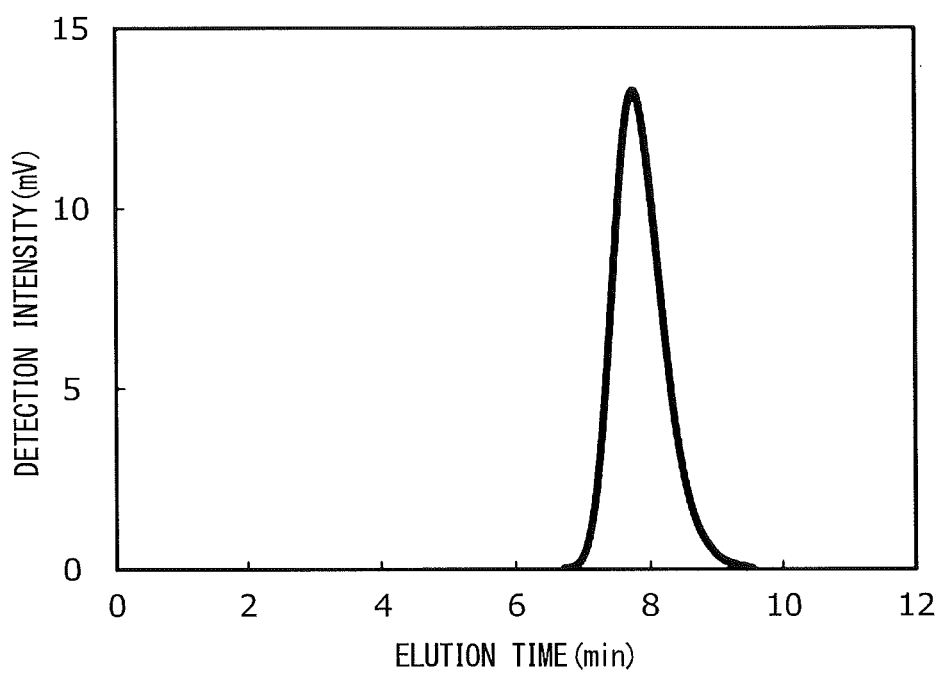
FIG. 6 is a diagram showing an elution curve by gel permeation chromatography of the methacrylic resin obtained in Comparative Example 2.

Split the area in the GPC elution curve around the elution time giving the molecular weight of ⅕ of Mph in the calibration curve and find the area in the GPC elution curve corresponding to the molecular weight component of ⅕ or less of Mph. The area in the GPC elution curve corresponding to the molecular weight component of ⅕ or less of Mph refers to the hatched portion shown in FIG. 2.

By dividing the area in the GPC elution curve corresponding to the molecular weight component of ⅕ or less of Mph by the area in the GPC elution curve, the proportion of the molecular weight component of ⅕ or less of Mph was calculated.

(Composition Analysis)

The composition analysis of the methacrylic resins obtained in the examples and comparative examples was carried out under the following apparatus and conditions, and the types and contents of the repeating units derived from the monomers in the methacrylic resin were confirmed.
Pyrolyzer: PY-2020D (Double Shot Pyrolyzer, manufactured by Frontier Laboratory Co., Ltd.)
Pyrolysis furnace temperature: 500° C.
Column inlet temperature: 230° C.
Column: HP-WAX (capillary column, manufactured by Agilent)
30 m×0.35 mmφ×0.25 μm
Column temperature condition: After holding at 50° C. for 5 minutes, increase the temperature up to 200° C. at a rate of temperature increase of 10° C./min, hold for 10 minutes
Gas Chromatograph: Agilent HP 6890 (manufactured by Agilent)
Carrier: Helium
Flow rate: 2 ml/min
Injection method: split (split ratio 1/20)
Detector: FID (Frame ion conductivity detector)

(Measurement of Spiral Flow Length)

The measurement of the spiral flow length is a measurement for determining the relative fluidity according to the distance through which the resin has flowed through a spiral cavity having a constant cross sectional area.

The methacrylic resins obtained in the Examples and Comparative Examples were injected onto the surface of the mold under the following conditions.
Injection molding machine: IS80FPA3-2A (manufactured by Toshiba Machine Co., Ltd.)
Measuring mold: A groove with a depth of 1 mm and a width of 15 mm was dug into the surface of the mold in a spiral shape from the center of the surface
Injection Molding Conditions
Resin temperature: 250° C.
Mold temperature: 60° C.
Injection speed: maximum
Injection pressure: 69 MPa
Injection time: 20 seconds
30 seconds after the completion of injection, the spirally shaped molded article of methacrylic resin was taken out, the length of the spiral portion was measured, and the moldability was evaluated as follows.
A: Excellent moldability when 140 mm or more.
B: Good moldability when 130 mm or more and less than 140 mm.
C: Inferior moldability when less than 130 mm.

(Measurement of Rupture Time by Cantilever Test)

The solvent resistance was evaluated by measuring the rupture time according to the cantilever test.

A methacrylic resin obtained in Examples and Comparative Examples was pressure molded, a test piece of 180 mm×25 mm×2 mm was cut out, annealed at 80° C. for 16 hours, and cooled. Regarding the obtained test piece, with reference to 11.2.4 of ECE 43, one end was fixed from above, a test part 60 mm away therefrom was fixed from below and a load was applied to the other end.

A load was set so that the stress of the test part was 14.7 MPa, a polyethylene terephthalate film having a width of 10 mm was placed on the test part, a trace amount of ethyl alcohol was impregnated by a dropper so as to impregnate the back of the film, and the time until the test piece fractured was measured.

Measurement was carried out five times for the same methacrylic resin and the average time of three times of the data that the data of the maximum time and the minimum time were deleted, was calculated and the solvent resistance was evaluated as follows.
A: Excellent solvent resistance when 150 seconds or longer.
B: Good solvent resistance when 120 seconds or more and less than 150 seconds.
C: Inferior solvent resistance when less than 120 seconds.

(Measurement of Bending Fracture Strength)

The bending strength (MPa) of the methacrylic resin obtained in Examples and Comparative Example was measured at a test piece thickness of 4 mm in accordance with ISO 178 and the mechanical properties were evaluated as follows.
A: Excellent mechanical properties when 138 MPa or more.
B: Good mechanical properties when 135 MPa or more and less than 138 MPa.
C: Inferior mechanical properties when less than 135 MPa.

(Measurement of Deflection Temperature Under Load)

The deflection temperature under load (° C.) of the methacrylic resin was measured in accordance with ISO 75-2 (load 1.8 MPa), and the heat resistance was evaluated as follows.

A: Excellent heat resistance when the temperature is 100° C. or higher.
B: Good heat resistance when 99.5° C. or more and less than 100° C.
C: Inferior heat resistance when less than 99.5° C.

Example 1

99.6 parts by mass of methyl methacrylate (MMA) and 0.4 parts by mass of methyl acrylate (MA) as monomers, 0.15 parts by mass of n-octyl mercaptan as a chain transfer agent, 0.0044 parts by mass of tert-butyl peroxy-3,5,5-trimethylhexanoate as the polymerization initiator 1 were continuously fed into a complete mixing vessel type reactor controlled at a polymerization temperature of 135° C. while stirring and mixing, and polymerization was carried out while continuously withdrawing the polymer composition (a mixture containing the monomer and the polymer) with a gear pump. Polymerization was carried out with a residence amount of the reaction solution in the reaction zone of 60 kg and an average residence time of 2 hours.

Subsequently, the withdrawn polymer composition was fed into the static mixer for a chain transfer agent mixture which was connected to the complete mixing vessel type reactor in series (trade name "SMX Sulzer Mixer", manufactured by Sumitomo Heavy Industries, Ltd., diameter: 27.2 mm, length: 650 mm). Further, 0.50 parts by mass of n-octyl mercaptan was supplied as a chain transfer agent in a static mixer for mixing a chain transfer agent and mixed with a polymer composition (mixture A).

Thereafter, the mixture A was fed into the static mixer for polymerization initiator mixture which was connected to the static mixer for the chain transfer agent mixture (trade name "SMX Sulzer Mixer", manufactured by Sumitomo Heavy Industries, Ltd., diameter: 27.2 mm, length: 650 mm). Further, in the static mixer for mixing the polymerization initiator, 0.0026 parts by mass of tert-butyl peroxy-3,5,5-trimethylhexanoate as the polymerization initiator 1, 0.0026 parts by mass of di-tert-butyl 0.0026 parts by mass of peroxide as the polymerization initiator 2 was diluted 100 times with methyl methacrylate and mixed with the mixture A (mixture B).

Thereafter, the polymerization was conducted by supplying the mixture B which passed through the static mixer for the polymerization initiator mixture to the plug flow type tube reactor connected to the static mixer for the polymerization initiator mixture (trade name "SMX Sulzer Mixer", manufactured by Sumitomo Heavy Industries, Ltd., diameter: 65.9 mm, length: 5000 mm).

The jacket temperature of the plug flow type tubular reactor was adjusted so that the outlet temperature of the plug flow type pipe reactor was to be 190° C. The obtained polymer (including unreacted monomers) was devolatilized by an extruder to obtain a methacrylic resin.

Example 2, Comparative Examples 1 and 2

Example 2, Comparative Examples 1 and 2 were conducted in the same manner as in Example 1 except that the feed amount shown in Table 1 was used to obtain a methacrylic resin.

The evaluation results of the obtained methacrylic resin are shown in Tables 2 and 3.

TABLE 1

| | Feed amount of polymerization in the first stage | | | | Feed amount of polymerization in the second stage | | |
|---|---|---|---|---|---|---|---|
| | MMA (parts by mass) | MA (parts by mass) | Chain transfer agent (parts by mass) | Polymerization initiator 1 (parts by mass) | Chain transfer agent (parts by mass) | Polymerization initiator 1 (parts by mass) | Polymerization initiator 2 (parts by mass) |
| Example 1 | 99.6 | 0.4 | 0.15 | 0.0044 | 0.50 | 0.0026 | 0.0026 |
| Example 2 | 99.4 | 0.6 | 0.15 | 0.0046 | 0.50 | 0.0028 | 0.0028 |
| Comparative Example 1 | 98.0 | 2.0 | 0.14 | 0.0046 | 0.50 | 0.0028 | 0.0028 |
| Comparative Example 2 | 98.0 | 2.0 | 0.22 | 0.0050 | N/A | 0.0020 | 0.0010 |

TABLE 2

| | Composition | | | | | Peak molecular | Peak molecular | |
|---|---|---|---|---|---|---|---|---|
| | MMA (parts by mass) | MA (parts by mass) | Polymerization method | Weight average molecular weight Mw | Molecular weight distribution | weight in the highest molecular weight region side Mph | weight in the lowest molecular weight region side Mpl | Proportion of the molecular weight component of 1/5 or less |
| Example 1 | 99.7 | 0.3 | continuous bulk polymerization | 99,000 | 3.73 | 130,000 | 17,000 | 25.8 |
| Example 2 | 99.4 | 0.6 | continuous bulk polymerization | 93,000 | 3.67 | 122,000 | 17,500 | 25.2 |

TABLE 2-continued

|  | Composition | | | | | Peak molecular | Peak molecular | |
|---|---|---|---|---|---|---|---|---|
|  | MMA (parts by mass) | MA (parts by mass) | Polymerization method | Weight average molecular weight Mw | Molecular weight distribution | weight in the highest molecular weight region side Mph | weight in the lowest molecular weight region side Mpl | Proportion of the molecular weight component of 1/5 or less |
| Example 3 | 99.7 | 0.3 | suspension polymerization | 103,000 | 3.63 | 136,000 | 17,000 | 23.0 |
| Example 4 | 99.4 | 0.6 | suspension polymerization | 103,000 | 3.58 | 135,000 | 17,000 | 22.0 |
| Example 5 | 99.7 | 0.3 | suspension polymerization | 104,000 | 4.23 | 152,000 | 17,000 | 30.0 |
| Comparative Example 1 | 98.5 | 1.5 | continuous bulk polymerization | 100,000 | 4.13 | 133,000 | 19,000 | 27.7 |
| Comparative Example 2 | 98.5 | 1.5 | continuous bulk polymerization | 99,000 | 1.86 | 83,000 | N/A | 4.8 |
| Comparative Example 3 | 99.4 | 0.6 | suspension polymerization | 90,000 | 1.91 | 86,000 | N/A | 6 |
| Comparative Example 4 | 99.7 | 0.3 | suspension polymerization | 91,000 | 1.90 | 86,000 | N/A | 6 |

TABLE 3

|  | Spiral flow length (mm) | | Rupture time in the cantilever test (sec) | | Bending fracture strength (MPa) | | Deflection temperature under load (° C.) | |
|---|---|---|---|---|---|---|---|---|
| Example 1 | 147 | A | 176 | A | 139.0 | A | 100.5 | A |
| Example 2 | 143 | A | 125 | B | 137.2 | A | 99.5 | A |
| Example 3 | 142 | A | 164 | A | 127.4 | B | 97.7 | B |
| Example 4 | 139 | B | 142 | B | 131.1 | B | 97.9 | B |
| Example 5 | 155 | A | 136 | B | 132.3 | B | 97.7 | B |
| Comparative Example 1 | 129 | C | 113 | C | 136.0 | A | 99.2 | A |
| Comparative Example 2 | 113 | C | 115 | C | 141.0 | A | 99.8 | A |
| Comparative Example 3 | 111 | C | 225 | A | 131.0 | B | 99.7 | A |
| Comparative Example 4 | 108 | C | 249 | A | 131.8 | B | 100.0 | A |

Copolymers (1) to (7) were prepared according to the following Production Examples 1 to 8 based on the compositions shown in Table 4.

Production Example 1

900 parts by mass of deionized water, 60 parts by mass of sodium 2-sulfoethyl methacrylate, 10 parts by mass of potassium methacrylate and 12 parts by mass of methyl methacrylate were supplied to a flask equipped with a stirrer, a thermometer and a cooling tube, and the flask was heated so that the internal temperature was 50° C. while discharging nitrogen. Thereafter, 0.08 part by mass of 2,2'-azobis (2-methylpropionamidine) dihydrochloride was supplied to the flask and heated so that the internal temperature of the flask was 60° C. Thereafter, using a dropping pump, methyl methacrylate was added dropwise at a rate of 0.24 parts by mass/minute for 75 minutes. Thereafter, the mixture was maintained for 6 hours to obtain a dispersant (solid content: 10% by mass).

Production Example 2

143 parts by mass of deionized water and 0.3 parts by mass of sodium sulfate were supplied to a separable flask equipped with a stirrer, a thermometer, a cooling tube and a nitrogen gas inlet tube and stirred at a stirring speed of 320 rpm for 15 minutes. Thereafter, 99.7 parts by mass of methyl methacrylate (trade name "Acrylester M", manufactured by Mitsubishi Rayon Co., Ltd.), 0.3 parts by mass of methyl acrylate, 0.1 part by mass of 2,2'-azobis-2-methylbutyronitrile (polymerization initiator, a trade name "V-59", manufactured by Wako Pure Chemical Industries, Ltd.) and 0.15 parts by mass of n-octyl mercaptan (chain transfer agent, manufactured by Tokyo Chemical Industry Co., Ltd.) were supplied to the separable flask and stirred for 5 minutes. Thereafter, 0.01 parts by mass (in terms of solid content) of the dispersant prepared in Preparation Example 1 was fed to a separable flask, stirred and nitrogen gas was discharged for 15 minutes.

Thereafter, the inner temperature of the separable flask was heated to 80° C., and the temperature was maintained until a polymerization exothermic peak was observed. After observing the polymerization exothermic peak, the inner temperature of the separable flask was heated to 90° C. and kept for 60 minutes to complete the polymerization. Thereafter, the mixture in the separable flask was filtered, the filtrate was washed with deionized water and dried at 50° C. for 16 hours to obtain a copolymer (1). The weight average molecular weight of the obtained copolymer (1) was 130,000.

Production Example 3

Copolymer (2) was obtained in the same manner as in Production Example 2 except that n-octylmercaptan was changed to 1.4 parts by mass.

Production Example 4

Copolymer (3) was obtained in the same manner as in Production Example 2 except that 99.4 parts by mass of methyl methacrylate, 0.6 parts by mass of methyl acrylate and 0.15 parts by mass of n-octyl mercaptan were used.

Production Example 5

Copolymer (4) was obtained in the same manner as in Production Example 4 except that n-octylmercaptan was changed to 1.4 parts by mass.

Production Example 6

Copolymer (5) was obtained in the same manner as in Production Example 2 except that n-octylmercaptan was changed to 0.13 parts by mass.

Production Example 7

Copolymer (6) was obtained in the same manner as in Production Example 4 except that the amount of n-octylmercaptan was changed to 0.22 parts by mass.

Production Example 8

Copolymer (7) was obtained in the same manner as in Production Example 2 except that the amount of n-octylmercaptan was changed to 0.22 parts by mass.

Example 3

74.2 parts by mass of the copolymer (1) and 25.8 parts by mass of the copolymer (2) were mixed with a Henschel mixer (model name "FM 20C/I", manufactured by Nippon Coke & Engineering Co., Ltd.), and extrusion shaping was carried out at a barrel temperature of 230° C. and a screw rotation speed of 60 rpm with use of the 40 mm kneading extruder (model name "VS 40-32 extruder", manufactured by Tanabe Plastic Machinery Co., Ltd., L/D=26), to obtain a methacrylic resin.

Examples 4 to 5, Comparative Examples 3 to 4

Examples 4 to 5, Comparative Examples 3 to 4 were conducted in the same manner as in Example 3 except that the content of the copolymer was changed as shown in Table 5 to obtain a methacrylic resin.

TABLE 4

|  | Copolymer Type | Monomer Composition | | Weight average molecular weight Mw | Molecular weight distribution Mw/Mn | Peak molecular weight Mp |
| --- | --- | --- | --- | --- | --- | --- |
|  |  | MMA (parts by mass) | MA (parts by mass) |  |  |  |
| Production Example 2 | (1) | 99.7 | 0.3 | 130,000 | 2.10 | 12,000 |
| Production Example 3 | (2) | 99.7 | 0.3 | 17,000 | 1.83 | 17,000 |
| Production Example 4 | (3) | 99.4 | 0.6 | 130,000 | 2.08 | 119,000 |
| Production Example 5 | (4) | 99.4 | 0.6 | 17,000 | 1.83 | 16,000 |
| Production Example 6 | (5) | 99.7 | 0.3 | 142,000 | 2.11 | 132,000 |
| Production Example 7 | (6) | 99.4 | 0.6 | 90,000 | 1.91 | 86,000 |
| Production Example 8 | (7) | 99.7 | 0.3 | 91,000 | 1.90 | 86,000 |

TABLE 5

|  | Copolymer | | Copolymer | |
| --- | --- | --- | --- | --- |
|  | Type | Content amount (parts by mass) | Type | Content amount (parts by mass) |
| Example 3 | (1) | 74.2 | (2) | 25.8 |
| Example 4 | (3) | 74.8 | (4) | 25.2 |
| Example 5 | (5) | 65.0 | (2) | 35.0 |
| Comparative Example 3 | (6) | 100 | N/A | N/A |
| Comparative Example 4 | (7) | 100 | N/A | N/A |

The methacrylic resin of the present invention obtained in Examples 1 to 5 was A evaluation or B evaluation in the spiral flow length, the rupture time in the cantilever test, the bending fracture strength, and the deflection temperature under load. Therefore, the methacrylic resin of the present invention excellent in moldability, mechanical properties and heat resistance were obtained.

On the other hand, the methacrylic resin having a high alkyl acrylate content obtained in Comparative Example 1 was inferior in moldability, mechanical properties and heat resistance. Further, the methacrylic resin having a low proportion of the molecular weight component of ⅕ or less of the peak molecular weight Mph in the high molecular weight region side obtained in Comparative Example 2 was inferior in moldability and mechanical properties. The methacrylic resins obtained in Comparative Examples 3 to 4 were inferior in moldability.

INDUSTRIAL APPLICABILITY

The present invention can provide a methacrylic resin excellent in moldability, solvent resistance, mechanical properties and heat resistance, and it is possible to provide a method for producing a methacrylic resin excellent in productivity. Further, since the shaped article of the present invention is excellent in solvent resistance, mechanical properties and heat resistance, it can be used for optical materials, parts for automobiles, materials for lighting, building materials, and the like. In particular, it can be suitably used for automotive parts for automobiles.

The invention claimed is:

1. A methacrylic resin, comprising:
   99.1% by mass or more and 99.9% by mass or less of a repeating unit derived from methyl methacrylate;
   0.1% by mass or more and 0.9% by mass or less of a repeating unit derived from an alkyl acrylate,
   wherein a proportion of molecular weight component of ⅕ or less of a peak molecular weight Mph in a high molecular weight region side obtained from an elution curve by a gel permeation chromatography of the methacrylic resin is 7% or more and 40% or less.

2. The resin of claim 1, having a weight average molecular weight Mw of 50,000 or more and 200,000 or less.

3. The resin of claim 1, having a molecular weight distribution of 2.5 or more and 6.0 or less.

4. The resin of claim 1, comprising:
   99.6% by mass or more and 99.9% by mass or less of the repeating unit derived from methyl methacrylate; and
   0.1% by mass or more and 0.4% by mass or less of the repeating unit derived from alkyl acrylate.

5. The resin of claim 1, wherein the elution curve has at least two peaks.

6. The resin of claim 5, wherein a peak molecular weight Mph in the highest molecular weight region side is 100,000 or more and 180,000 or less.

7. The resin of claim 5, having a peak molecular weight Mpl in the lowest molecular weight region side of 8,000 or more and 30,000 or less.

8. The resin of claim 1, having a spiral flow length of 130 mm or more.

9. The resin of claim 1, having a rupture time in a cantilever test is 120 seconds or more.

10. The resin of claim 1, having a bending fracture strength of 135 MPa or more.

11. The resin of claim 1, having a deflection temperature under load of 98° C. or more.

12. A methacrylic resin, having a spiral flow length of 130 mm or more and a bending fracture strength of 135 MPa or more.

13. The resin of claim 12, having a rupture time in the cantilever test of 120 seconds or more.

14. A method for producing the resin of claim 1, the method comprising performing a continuous bulk polymerization of a monomer mixture comprising the methyl methacrylate and the alkyl acrylate.

15. A shaped article, formed by shaping the resin of claim 1.

16. A automobile, comprising the article of claim 15.

17. The resin of claim 1, having a weight average molecular weight Mw of 70,000 or more and 150,000 or less.

18. The resin of claim 1, having a weight average molecular weight Mw of 80,000 or more and 120,000 or less.

19. The resin of claim 1, having a molecular weight distribution of 3.0 or more and 5.0 or less.

20. The resin of claim 1, having a molecular weight distribution of 3.5 or more and 4.5 or less.

* * * * *